US011314811B1

(12) United States Patent
Hume et al.

(10) Patent No.: US 11,314,811 B1
(45) Date of Patent: Apr. 26, 2022

(54) SYSTEMS AND METHODS FOR SEMANTIC SEARCH ENGINE ANALYSIS

(71) Applicant: Rentpath, LLC, Atlanta, GA (US)

(72) Inventors: Stuart Hume, Atlanta, GA (US); Ilias Fountalis, Atlanta, GA (US); Elizabeth Grace Bertasi, Atlanta, GA (US)

(73) Assignee: RentPath Holdings, Inc., Atlanta, GA (US)

( * ) Notice: Subject to any disclaimer, the term of this patent is extended or adjusted under 35 U.S.C. 154(b) by 148 days.

(21) Appl. No.: 16/539,179

(22) Filed: Aug. 13, 2019

Related U.S. Application Data (60) Provisional application No. 62/717,934, filed on Aug. 13, 2018.

(51) Int. Cl.
*G06F 17/00* (2019.01)
*G06F 16/9032* (2019.01)
(Continued)

(52) U.S. Cl.
CPC .... *G06F 16/90332* (2019.01); *G06F 16/9532* (2019.01); *G06F 16/9538* (2019.01); *G10L 15/193* (2013.01); *G10L 15/26* (2013.01)

(58) Field of Classification Search
CPC ........... G06Q 30/0206; G06Q 30/0278; G06Q 30/02; G06Q 50/16; G06Q 30/0641; G06Q 30/0643; G06Q 20/201; G06Q 30/00; G06Q 30/0222; G06Q 30/0223; G06Q 30/0224; G06Q 30/0205; G06Q 30/0645; G06F 16/2379; G06F 16/9535; G06F 16/29; G06F 16/9536; G06F 16/9538; G06F 40/20; G06F 16/24575; G06F 40/30; G06F 16/248; G06F 16/335; G06F 3/048; G06F 40/103; G06F 16/00; G06F 16/2457; G06F 16/24573; G06F 16/26; G06F 16/3329; G06F 16/3344; G06F 16/538; G06F 16/58; G06F 16/90332; G06F 16/906; G06F 16/95;
(Continued)

(56) References Cited

U.S. PATENT DOCUMENTS 10,817,527 B1 * 10/2020 Setlur .................. G06F 3/04847
2005/0288958 A1 * 12/2005 Eraker ............... G06Q 30/0601
705/316

(Continued)

*Primary Examiner* — Michael Ortiz-Sanchez
(74) *Attorney, Agent, or Firm* — Morris, Manning & Martin, LLP; Daniel E. Sineway, Esq.; Daniel T. Begasse (57) ABSTRACT

Systems and methods for semantic search engine analysis are disclosed. Generally, the system receives user provided text and/or speech search input, and further processes the search input to determine a semantic meaning. If the search input is speech, the system may first convert the speech into text. The system lexically processes the search input for ensuring the search input is valid, tags portions of the search input with metadata for applying a meaning of the tagged portions, and generally analyzes the relative locations of individual words and phrases to determine grammatical or linguistic relationships within the search input. In some embodiments, the system may disambiguate words or search terms, as well as provide input suggestions to the user. The system may use the manipulated search input to generate a search query, such as a query for searching apartment listing databases, and further display the search query results to the user.

20 Claims, 5 Drawing Sheets

(51) Int. Cl.
  *G06F 16/9532* (2019.01)
  *G10L 15/193* (2013.01)
  *G10L 15/26* (2006.01)
  *G06F 16/9538* (2019.01)

(58) Field of Classification Search
  CPC ............... G06F 16/953; G06F 16/958; G06F 2203/0381; G06F 40/279; G06F 9/453; G06F 9/468; G06F 40/205; G06F 40/284; G06F 40/216; G06F 40/295; G06F 16/338; G06F 16/438; G06F 16/9038; G06F 16/2453; G06F 16/3338; G06F 16/632; G06F 16/738; G06F 40/10; H04L 51/04; G06K 9/6267; G06K 2209/27; G06K 9/6292; G10L 15/22; G10L 15/1815; G10L 15/183; G10L 15/26; G10L 13/08; G10L 15/00; G10L 15/1822; G10L 17/22; G10L 2015/223; G10L 2015/088; G06N 20/00
  See application file for complete search history.

(56) References Cited

U.S. PATENT DOCUMENTS

| | | | |
|---|---|---|---|
| 2005/0288959 A1* | 12/2005 | Eraker | G06Q 30/0251 705/1.1 |
| 2014/0316768 A1* | 10/2014 | Khandekar | G06F 16/3329 704/9 |
| 2016/0239896 A1* | 8/2016 | Chay | G06F 16/29 |
| 2017/0242885 A1* | 8/2017 | Svonja | G06F 16/24522 |
| 2019/0034540 A1* | 1/2019 | Perkins | G06F 16/2228 |

* cited by examiner

FIG. 1: SEMANTIC SEARCH SYSTEM

*FIG. 2: SEMANTIC SEARCH PROCESS*

FIG. 3: EXEMPLARY TEXT PROCESSING

FIG. 4: EXEMPLARY ONTOLOGY

FIG. 5: SEMANTIC SEARCH ENGINE

SYSTEMS AND METHODS FOR SEMANTIC SEARCH ENGINE ANALYSIS

CROSS REFERENCE TO RELATED APPLICATIONS

This application claims the benefit of, and priority to, U.S. Provisional Patent Application No. 62/717,934, filed on Aug. 13, 2018, and entitled "SYSTEMS AND METHODS FOR SEMANTIC SEARCH ENGINE ANALYSIS," the disclosure of which is incorporated by reference as is the same were set forth fully herein.

TECHNICAL FIELD

The present disclosure relates generally to searching data, and more specifically to systems and methods for searching data via semantic search engine analysis.

BACKGROUND

Conventional systems and methods for searching data, such as searching data via a search engine, rely solely on a user's input. Accordingly, a search engine or the like may conduct searches based only on the exact user input, or portions of the user input. These conventional methods may make the searching process difficult for a user, and often the user is not presented with the results he/she expected to receive, or not all of the potentially relevant results are presented due to a gap between the user's intended search and the searching method's implementation of the user input.

Therefore, there exists a long felt but unresolved need for systems and methods for improving data searching by providing context to user input, such as a user's speech and/or text, for providing more accurate search results.

BRIEF SUMMARY OF DISCLOSURE

The present systems and methods relate generally to semantically searching databases, and more particularly to determining context of voice and/or text search inputs for generating more accurate search results via semantic searching. Consider, for example, a scenario where a user is searching for property listings (e.g., available apartments) using a mobile computing device such as his/her smartphone. In this example, the user may interact with a search platform, an internet browser, etc., for inputting search criteria for generating a search query. According to various aspects of the present disclosure, the user in this example may type the search criteria, "2 bed 1 bath midtown atlanta," or the user may vocally express the search criteria by speaking the words such as "I am looking for a two bedroom apartment in midtown with one bath." In various embodiments, both the typed and spoken search inputs represent equivalent intended search queries, and the present systems and methods transform these search queries into formats optimized for providing the user with an improved searching experience, thus improving upon conventional UI-based searching systems to increase the efficiency of using mobile devices and/or other computing devices.

According to various aspects of the present disclosure, the system leverages a distributed architecture for determining voice and/or text search contexts. In particular embodiments, included within the distributed architecture are preconfigured rule engines, as well as machine learning engines (or modules), for translating search inputs and analyzing natural language. In one embodiment, the preconfigured rule engines and/or machine learning engines may receive search inputs from the user's mobile computing device and furthermore determine the context of the search inputs for returning search results (e.g., available apartment listings matching the determined context).

In one embodiment, the present disclosure discusses a system including a web-based platform operatively connected to an electronic computing device running an application, wherein the web-based platform receives real-time user input from the electronic computing device in response to a user providing a plurality of search terms via the application, and wherein the plurality of search terms include location, price, and/or size information relating to available dwellings for rent or purchase; and a semantic search engine operatively connected to the web-based platform, wherein the semantic search engine receives the real-time user input from the web-based platform, and wherein in response to receiving the real-time user input, the sematic search engine is operable to: perform text processing on the real-time user input for determining a semantic context of the real-time user input via natural language processing algorithms, wherein the text processing generates a search query including a plurality of search terms; transmit the search query to a search database for matching the plurality of search terms with relevant data, wherein relevant data includes dwelling listings and corresponding dwelling listing information; receive search results from the search database, wherein the search results include matched relevant data; and transmit the search results to the user for presenting the search results on a display at the electronic computing device.

In a particular embodiment, text processing further includes: performing lexical processing on the real-time user input, wherein lexical processing includes parsing the real-time user input to remove typos, and further includes generating lexically processed text objects from parsed real-time user input; tagging the lexically processed text objects with metadata to generate tagged text objects; performing syntax analysis on the tagged text objects, wherein syntax analysis includes analyzing individual terms in the tagged text objects for identifying a relational text structure based on predetermined grammar rules; and generating the search query, wherein the search query includes a plurality of search terms including the lexically processed text objects and/or the tagged text objects, to be transmitted to the semantic search engine.

In various embodiments, the semantic search engine is further operable to, in response to performing syntax analysis on the tagged text objects, perform a disambiguation process on the tagged text objects, wherein the disambiguation process includes evaluating a tagged text object as multiple tagged text objects for independently processing each of the multiple tagged text objects for generating separate search queries with different semantic contexts. In certain embodiments, the semantic search engine is further operable to generate input suggestions based on the tagged text. According to various aspects of the present disclosure, input suggestions are generated based on models trained via machine learning algorithms.

In a particular embodiment, the real-time user input includes text and/or voice data. In one embodiment, prior to performing text processing, the system determines if the real-time user input includes text or voice data. In various embodiments, in response to determining that the real-time user input includes voice data, converting the voice data to text via speech-to-text algorithms.

In certain embodiments, tagging the lexically processed text objects includes inserting metadata at locations in the lexically processed text objects identified to include a search keyword. In one embodiment, a search keyword includes a particular state, city, and/or zip code, and the metadata includes a geographic location tag for classifying the search keyword.

In various embodiments, the present disclosure discusses a method, wherein a semantic search engine operatively connected to a web-based platform receives real-time user input from the web-based platform, wherein the web-based platform is operatively connected to an electronic computing device running an application and receives the real-time user input from the electronic computing device in response to a user providing a plurality of search terms via the application, and wherein the plurality of search terms include location, price, and/or size information relating to available dwellings for rent or purchase, and in response to receiving the real-time user input, the sematic search engine is operable to perform the method steps of: performing text processing on the real-time user input for determining a semantic context of the real-time user input via natural language processing algorithms, wherein the text processing generates a search query including a plurality of search terms; transmitting the search query to a search database for matching the plurality of search terms with relevant data, wherein relevant data includes dwelling listings and corresponding dwelling listing information; receiving search results from the search database, wherein the search results include matched relevant data; and transmitting the search results to the user for presenting the search results on a display at the electronic computing device.

According to various aspects of the present disclosure, text processing further includes: performing lexical processing on the real-time user input, wherein lexical processing includes parsing the real-time user input to remove typos, and further includes generating lexically processed text objects from parsed real-time user input; tagging the lexically processed text objects with metadata to generate tagged text objects; performing syntax analysis on the tagged text objects, wherein syntax analysis includes analyzing individual terms in the tagged text objects for identifying a relational text structure based on predetermined grammar rules; and generating the search query, wherein the search query includes a plurality of search terms including the lexically processed text objects and/or the tagged text objects, to be transmitted to the semantic search engine.

In one embodiment, the semantic search engine is further operable to perform the step of, in response to performing syntax analysis on the tagged text objects, performing a disambiguation process on the tagged text objects, wherein the disambiguation process includes evaluation a tagged text object as multiple tagged text objects for independently processing each of the multiple tagged text objects for generating separate search queries with different semantic contexts.

In certain embodiments, the semantic search engine is further operable to perform the step of generating input suggestions based on the tagged text. In a particular embodiment, input suggestions are generated based on models trained via machine learning algorithms.

In various embodiments, the real-time user input includes text and/or voice data. In one embodiment, prior to performing text processing, the method further includes the step of determining if the real-time user input includes text or voice data. According to various aspects of the present disclosure, in response to determining that the real-time user input includes voice data, converting the voice data to text via speech-to-text algorithms.

In a particular embodiment, tagging the lexically processed text objects includes inserting metadata at locations in the lexically processed text objects identified to include a search keyword. In certain embodiments, a search keyword includes a particular state, city, and/or zip code, and the metadata includes a geographic location tag for classifying the search keyword.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to semantically searching databases, and more particularly, to determining context of voice and/or text search inputs for generating more accurate search results via semantic searching. Consider, for example, a scenario where a user is searching for property listings (e.g., available apartments) using a mobile computing device such as his/her smartphone. In this example, the user may interact with a search platform, an internet browser, etc., for inputting search criteria for generating a search query. According to various aspects of the present disclosure, the user in this example may type the search criteria, such as "2 bed 1 bath midtown atlanta," or the user may vocally express the search criteria by speaking the words such as "I am looking for a two bedroom apartment in midtown with one bath." In various embodiments, both the typed and spoken search inputs represent equivalent intended search queries, and the present systems and methods transform these search queries into formats optimized for providing the user with an improved searching experience, thus improving upon conventional UI-based searching systems to increase the efficiency of using mobile devices and/or other computing devices.

According to various aspects of the present disclosure, the system leverages a distributed architecture for determining voice and/or text search contexts. In particular embodiments, included within the distributed architecture are preconfigured rule engines, as well as machine learning engines, for translating search inputs and analyzing natural language. In one embodiment, the preconfigured rule engines and/or machine learning engines may receive search inputs from the user's mobile computing device and furthermore determine the context of the search inputs for returning search results (e.g., available apartment listings matching the determined context).

Figure 1:
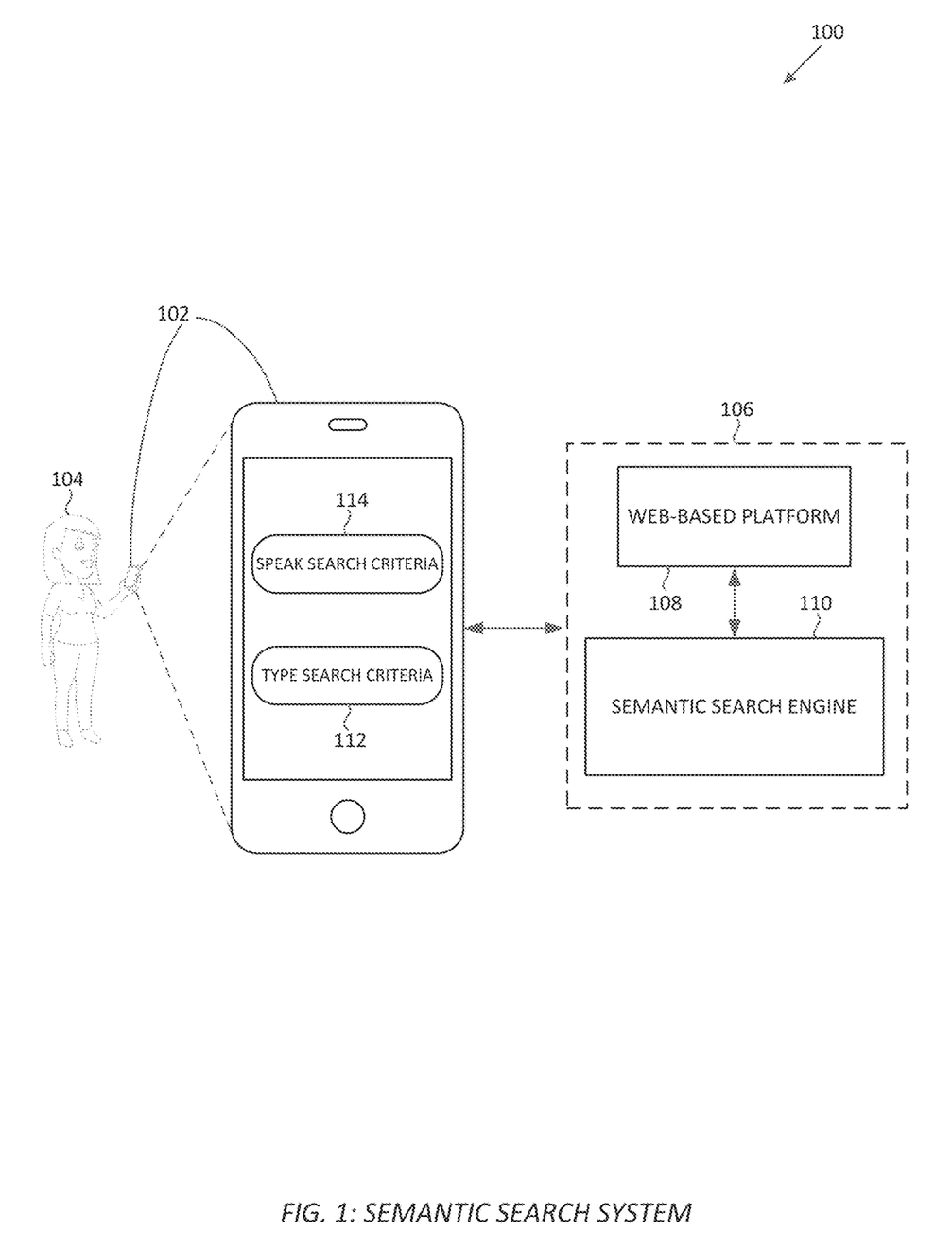
FIG. 1 is a diagram of the semantic search system, according to one aspect of the present disclosure.

Referring now to the figures, FIG. 1 is a diagram illustrating a sematic search system 100, according to one aspect of the present disclosure. In various embodiments, the semantic search system 100 is a distributed system including a plurality of computing components across multiple locations. As will be discussed throughout the disclosure herein, the semantic search system 100 improves upon conventional UI-based searching systems by interpreting context of user search inputs and further providing the user with search results based on the herein disclosed enhanced search methods to increase the efficiency of using mobile devices.

In an exemplary embodiment, the semantic search system 100 includes a mobile computing device 102 operated by a user 104. In particular embodiments, the mobile computing device 102 may be a smartphone, a tablet, a laptop computer, desktop computer, or any other appropriate computing device for accepting user input (e.g., typed text, voice commands, hand gestures, etc.). According to various aspects of the present disclosure, the mobile computing device 102 may be operatively connected to a remote computing environment 106, where the mobile computing device 102 and the remote computing environment 106 are operable to interchangeably transmit and receive data between each component over a wireless (e.g., internet, LAN, WLAN, etc.) or a wired (e.g., Ethernet, etc.) connection.

In one embodiment, the remote computing environment 106 may include one or more platforms, engines, or overall hardware/software modules, for enabling communication with the mobile computing device 102, as well as for processing data received from the mobile computing device 102. As shown in the present embodiment, the remote computing environment 106 may include a web-based platform 108 and a semantic search engine 110. In various embodiments, the web-based platform 108 is a platform accessible via the mobile computing device 102 (over a web/network connection) where the user 104 may view, search, and generally engage with content hosted on the web-based platform 108. In certain embodiments, the web-based platform 108 may be an apartment listings site, where the user 104 may enter search criteria to be presented with apartment listings that meet the entered search criteria. In one embodiment, the semantic search engine 110 is in operative communication with both the mobile computing device 102 and the web-based platform 108. In particular embodiments, the semantic search engine 110 may include one or more software modules (e.g., servers, processing threads, etc.) for processing user input (e.g., speech and text). These software modules are described in greater detail below in association with the discussion of FIG. 5. In various embodiments, the semantic search engine 110 may process user input according to predefined rules, as well as process user input according to machine learning trained algorithms and computing models.

Continuing with FIG. 1, the operative connection between the mobile computing device 102 and the remote computing environment 106 allows for user input to be transmitted from the mobile computing device 102 to the remote computing environment 106. In particular embodiments, the user 104 may provide input in a variety of methods, such as manually typing text on the mobile computing device 102, performing hand gestures near the mobile computing device 102, speaking in close proximity to the mobile computing device 102, etc. In various embodiments, a UI on the mobile computing device 102 may allow or prompt the user 104 to provide such input, as shown in the present embodiment as "Speak Search Criteria" 114 and "Type Search Criteria" 112. According to various aspects of the present disclosure, the user 104 may speak or type his/her desired search criteria to be received by the mobile computing device 102, which in turn may transmit the user input to the remote computing environment 106 to be processed by the semantic search engine 110. In particular embodiments, the semantic search engine 110 may uniquely process the user input in order to determine the semantic meaning of the user input (as further discussed herein). In one embodiment, the processed user input may be used for generating a search query for searching the web-based platform 108 listing databases, where optimized search results can in return be transmitted to the mobile computing device 102.

Figure 2:
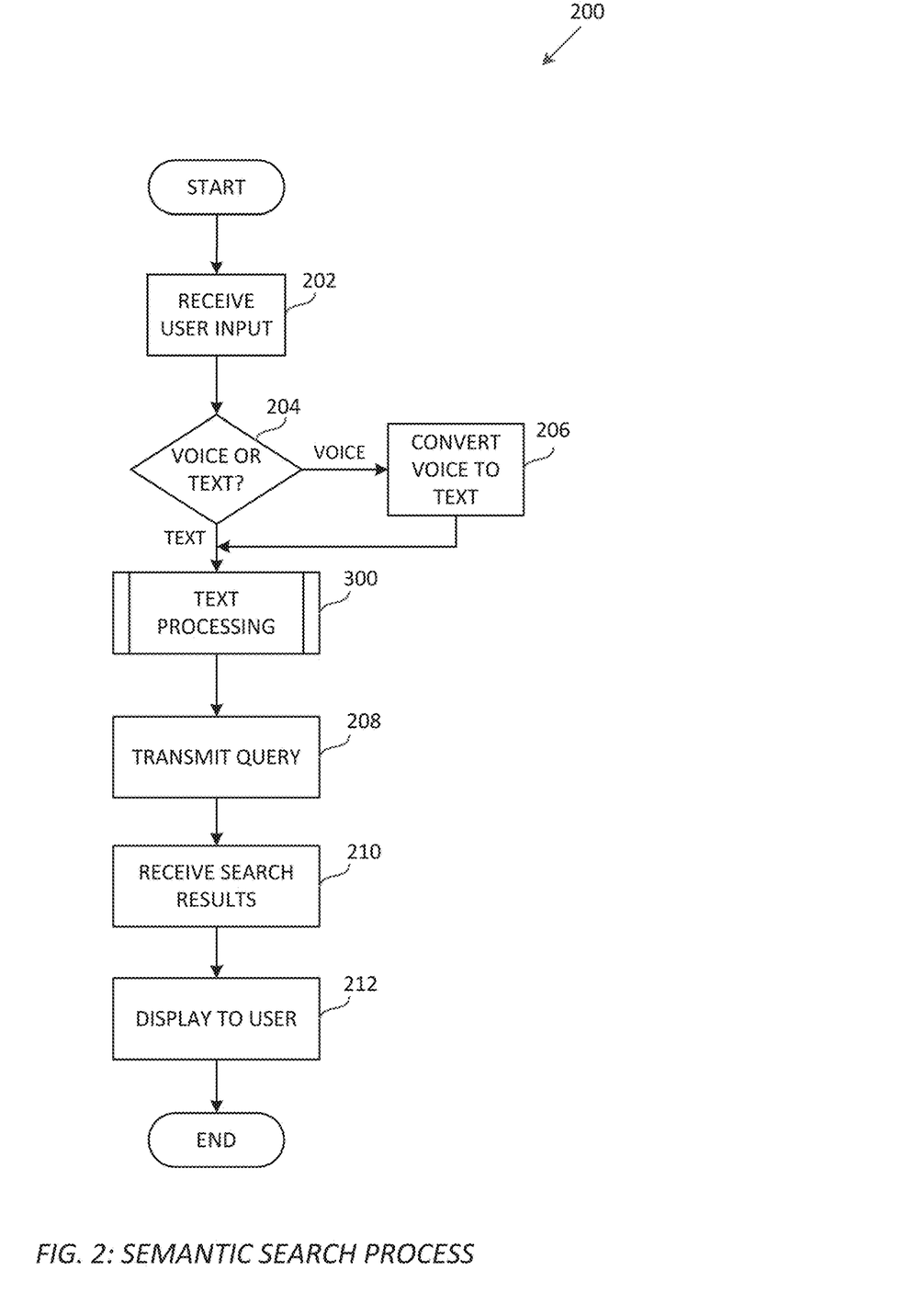
FIG. 2 is a flowchart illustrating the exemplary semantic search process, according to one aspect of the present disclosure.

Turning now to FIG. 2, a flowchart illustrating an exemplary semantic search process 200 is shown, according to one aspect of the present disclosure. In particular embodiments, the exemplary semantic search process 200 is the process by which the system receives search inputs from the user 104 and furthermore determines the semantic context of the search input for querying a database to present optimal search results to the user 104.

In one embodiment, the exemplary semantic search process 200 begins at step 202 where the system receives user input. According to various aspects of the present disclosure, receiving the user input may include receiving the input at the mobile computing device via voice or text input, and the process may operate local to the mobile computing device 102. In some embodiments, receiving the user input may include receiving a data transmission of the user input at the remote computing environment 106. As discussed throughout the present disclosure, the user input received at step 202 may be text or voice input. For example, the user may use his/her mobile computing device 102 (or any other appropriate computing device) to type the following search criteria, "2 bed 1 bath midtown atlanta." In particular embodiments, the user may also vocally announce his/her search criteria by speaking at or into the mobile computing device 102, where the mobile computing device 102 captures the spoken language, such as, "I am looking for a two bedroom apartment in midtown with one bath." In certain embodiments, the system may be configured to store the received user input at the mobile computing device 102 for a predetermined amount of time (e.g., in the computing device cache), or the system may begin processing the received data without storing the data. In one embodiment, the data may be stored locally to the mobile computing device 102, at the remote computing environment 106, or at a remote location.

In one embodiment, the process 200 proceeds to step 204 where the system determines the type of user input received at step 202. According to various aspects of the present disclosure, determining the type of user input may include determining if an audio sensor at the mobile computing device 102 was engaged (indicative of receiving vocal user input). In certain embodiments, I/O from the mobile computing device keypad or touch-keyboard may indicate text input from the user. In certain embodiments, the user may indicate how he/she intends to input search criteria via selecting a search bar to initiate a text input, selecting a speaker or voice icon to initiate a voice input, etc., which prepares the system to receive a particular type of input. In particular embodiments, the type of user input may be determined based on the data format of the stored input, descriptive metadata associated with the input, or any other appropriate way of determining input type.

In particular embodiments, if, at step 204, it is determined that the user input is a voice input, the process 200 may proceed to step 206 where the received voice input is converted into text. According to various aspects of the present disclosure, converting the received voice to text at step 206 allows for the voice to be represented as natural language and furthermore processed as if the voice input was entered as text, which in turn allows for the system to generate a text-based search query to match the semantic meaning of the spoken text. In one embodiment, the voice input is converted into text via a speech-to-text converter software tool, such as tools provided by Python, Google Speech Recognition, tensorflow, other third-party tools, or a proprietary tool. Accordingly, these tools may be included in the semantic search engine, in particular embodiments.

According to various aspects of the present disclosure, converting speech to text may include identifying recognizable patterns in an audio file (e.g., the received audio input), where the recognizable patterns correspond to certain words and phrases. For example, various instances of the spoken word "bedroom" by various different speakers may each include similar patterns within the audio file that allow for the speech-to-text tools to generate a word, in text, to correspond to the particular sample of the audio file. In some embodiments, the system may scan the audio file for samples of digital data that represent phonemes, and these phonemes may be analyzed to convert the spoken word(s) into text. In particular embodiments, the system may use the machine learning engine to build neural networks, random forests, etc., for predicting the meaning of certain spoken words.

In various embodiments, if, at step 204, it is determined that the received user input is text, or after voice input is converted to text at step 206, the process 200 may proceed to the text processing process 300. In one embodiment, the text processing process 300 may transform, augment, and/or enhance the user's text input. As will be described in greater detail below in association with the discussion of FIG. 3, the text processing process 300 may include determining the context of the text via various text processing and analysis techniques.

Figure 3:
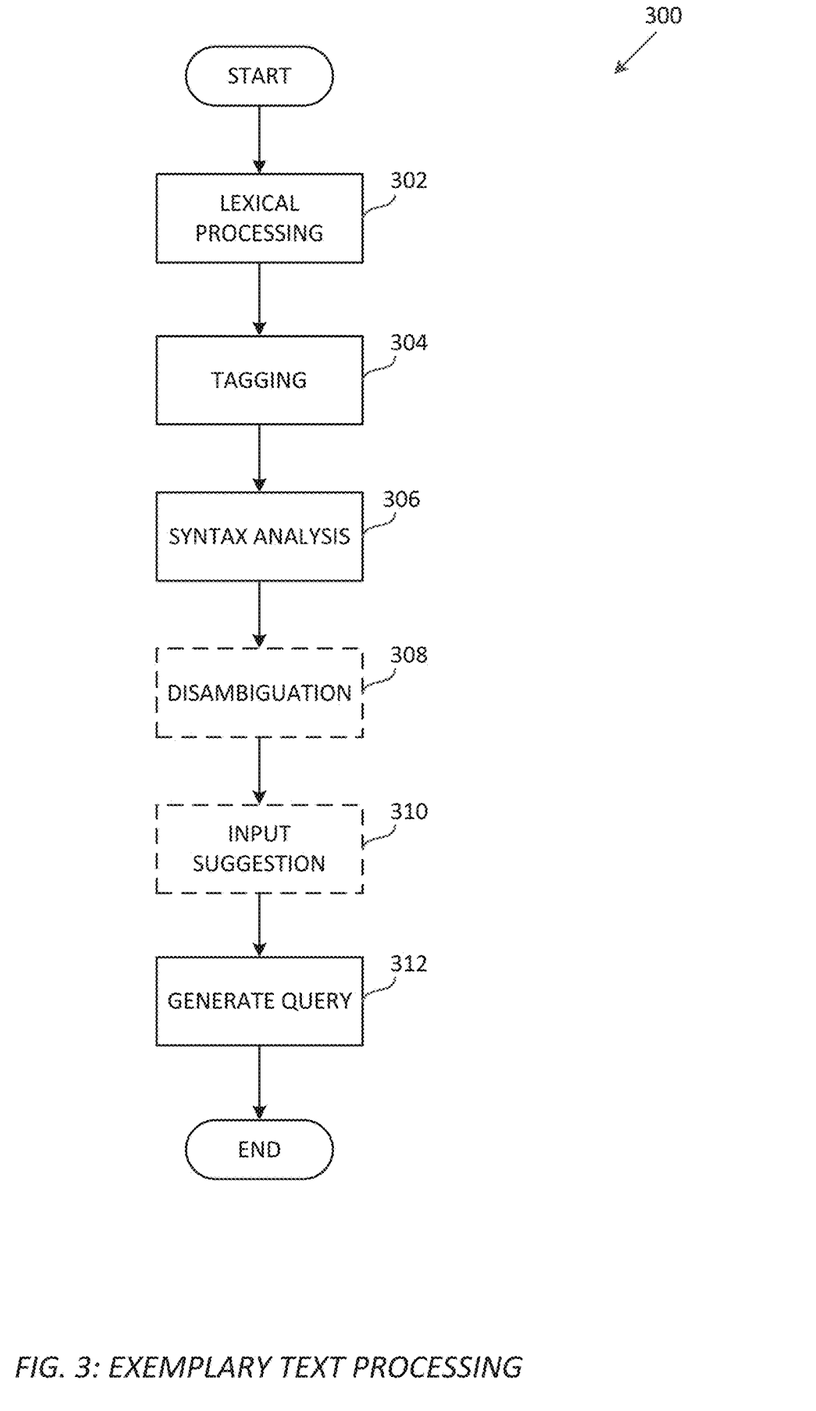
FIG. 3 is a flowchart illustrating the exemplary text processing process, according to one aspect of the present disclosure.

In response to the user input being processed at the text processing process 300, the process may proceed to step 208, where the system transmits an optimized text query (returned from the process 300) to a search database. In one embodiment, the search database may be a third-party database, or a database included in (or operatively connected to) the semantic search engine. In various embodiments, the system may receive the search results at step 210, and furthermore display the search results to the user at step 212. In particular embodiments, displaying the results to the user may include modifying the display or screen of his/her computing device to show a list of matching results, a grid of images (such as thumbnail images of apartments) corresponding to matching results, a carousel of scrollable/swipeable informative tabs or cards corresponding to the matching results, etc.

Turning now to FIG. 3, a flowchart is shown illustrating an exemplary text processing process 300, according to one aspect of the present disclosure. In various embodiments, the exemplary text processing process 300 modifies the user's search input, which in turn allows for the system to determine the semantic meaning of the input to drive improved search results. In certain embodiments, the sematic meaning of the search input is determined according to a predefined ontology, where the predefined ontology is a framework for interpreting user input with respect to particular search domains (e.g., an ontology for searching a domain including apartment listings). According to various aspects of the present disclosure, the predefined ontology may include "primitives" and "relationships" for providing the system with a basis for determining how search inputs are to be understood by a computing system. These predefined ontologies are discussed in further detail in association with FIG. 4, below.

In one embodiment, the exemplary text processing process 300 begins at step 302, where the user input is lexically processed. In one embodiment, lexical processing includes correcting spelling, breaking the string of input text into "tokens" (individual words or phrases from the string of input text), and also normalizing and/or substituting certain words. In particular embodiments, the lexical processing at step 302 prevents search errors that may result from misspellings, and generally allows for the system to more efficiently process the user input. According to various aspects of the present disclosure, the lexical processing step 302 may include searching and parsing a user input for identifying text to be processed as natural language. Furthermore, the searched and parsed text may be used for generating search queries for processing via search engines, as discussed herein.

In various embodiments, in response to the user input being lexically processed at step 302, the process 300 may proceed to step 304, where the lexically processed user input is annotated via data tagging. According to various aspects of the present disclosure, tagging the user input includes identifying meaningful words or word sequences within the user input and assigning those words and/or sequences labels corresponding to primitives in the system ontology. For example, a search input including "Atlanta Ga." may be tagged as a "location" primitive, where Atlanta is a "city" relationship and Georgia is a "state" relationship. In particular embodiments, expressions of dates, quantities, monetary values, percentages, and other elements of a user input may be tagged according to the system ontology. In certain embodiments, tagging includes attaching metadata to the search input. In some embodiments, tagging may include generating a new data object, such as a data tree, where the data object includes instantiated class objects representative of the tagged primitives and relationships according to the predefined ontology.

In one embodiment, the process 300 proceeds to step 306 where the system performs syntax analysis on the tagged user input from step 304. In various embodiments, the syntax analysis at step 306 includes interpreting the user input based on the structure of the user input (e.g., the words included in the user input, the relative location of the words, etc.). According to various aspects of the present disclosure, the syntax of the user input is interpreted based on predetermined grammar rules, where the predetermined grammar rules operate by determining a sequence of words and then furthermore determining an interpretation of the sequence. For example, consider a user input included the sequence of words "three bedroom." In this example, the grammar rules may be configured to recognize the word "three" and represent (in computer memory) that word as a numerical value. Additionally, the grammar rules may further be configured to recognize that the word "bedroom" following a word indicative of a numerical value (such as the word "three"), may be intended to inherit the value of the numerical value, such that the words "three bedroom" should be interpreted as a bedroom with a value of three. According to various aspects of the present disclosure, the following computer-readable code may resemble instructions for making a grammatical determination on a user input:

(1): [three]→Quant(3)
(2): [Quant(N) bedroom]→bedroom=N

As shown in the exemplary code above, the system may determine that particular words are representative of value, and furthermore attribute that value to other words based on the interrelated structure of the words in the use input.

In various embodiments, the process 300 may proceed to the optional step 308, where the user input is disambiguated. According to various aspects of the present disclosure, disambiguation at step 308 occurs when the user input can be interpreted, based on the system ontology, in more than one way. For example, user input including "apartment with garden tub" may be interpreted by the system as a "garden tub," or a "garden" and a "tub." In particular embodiments, in this scenario the system may resolve disambiguation in various ways. In one embodiment, the system may generate multiple queries based on the various interpretations of the ambiguous input, and furthermore allow the user to dismiss query results that fail to return any meaningful/relevant results. In some embodiments, the system may determine to present the query results with the highest number of relevant hits, or the system may combine the results of multiple queries. In certain embodiments, the system may present to the user 104 one set of results from an ambiguous input (e.g., the most popular results or the highest number of results), and furthermore allow for the user 104 to clarify his/her request if the search results do not match the intended input.

Proceeding now to step 310, the system may also perform an optional input suggestion step. In one embodiment, the optional input suggestion step 310 allows for the system to leverage the machine learning engine to apply previous search inputs, selected results, and any other user search activity, to predict the user's current search intentions for improving the overall search experience. For example, if the system includes stored data indicating that the user generally searches for three bedroom apartments, upon the user entering search input such as "3 b", the system may suggest (via a notification, auto-populated text, etc.) the complete search input "3 bedroom" to the user based on his/her prior searches. According to various aspects of the present disclosure, the machine learning engine may determine to suggest "3 bedroom" rather than "3 bathroom" based on the user's prior search history. In certain embodiments, the machine learning engine may determine to suggest "3 bedroom" rather than "3 bathroom" based on third-party search data, where the third-party search data includes data from searches of other users in substantially similar geographic locations, and these other users search for "3 bedroom" more frequently than "3 bathroom." In a particular embodiment, the machine learning engine may implement techniques such as random forest generation, neural networks, gradient boosting, and boosted trees for determining predictive outcomes.

In one embodiment, at step 312, the system generates the search query to be transmitted to the search database. According to various aspects of the present disclosure, the search query generated at step 312 is representative of the original user input, however, the system has modified the search input for determining the semantic meaning of the input for driving optimized search results. In various embodiments, the query may resemble an abstract syntax tree, or the like, generated based on the particular ontology used to process the user input. For example, the particular ontology may allow for a range of search criteria to be included in the query, however, only the criteria included in the user input will be used to generate the query (as will be further described in the discussion of FIG. 4 below).

Figure 4:
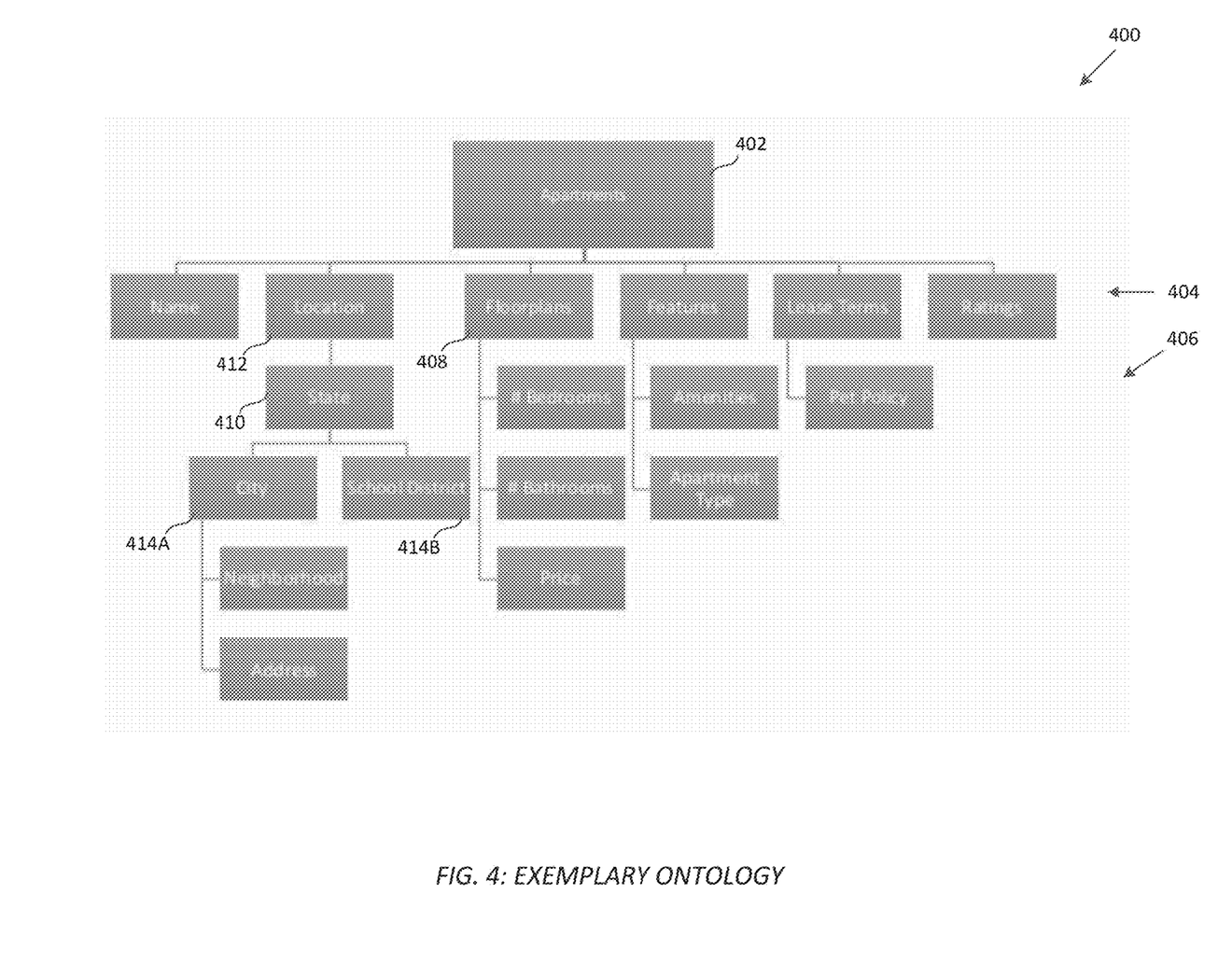
FIG. 4 is a diagram illustrating an exemplary classification hierarchy, according to one aspect of the present disclosure.

Turning now to FIG. 4, an exemplary ontology 400 is shown, according to one aspect of the present disclosure. In the present embodiment, the exemplary ontology 400 is for processing searches for apartments/apartment listings. According to various aspects of the present disclosure, if the system receives user input for searching apartment listings, the user input may be processed according to the structure of the ontology 400 and, in this way, portions of the input may be identified and correlated to portions of the ontology in order to generate a search query.

In one embodiment, an ontology parent node 402 (shown as Apartments) includes one or more primitive children nodes, indicated in the present ontology by the primitives 404. In various embodiments, these primitives 404 include nodes such as Name, Location, Floorplans, Features, Lease Terms, Ratings, etc. In one embodiment, the primitives 404 included in the ontology 400 represent high-level categories that may be further defined via one or more specified categories (e.g., relationships nodes).

Continuing with FIG. 4, the exemplary hierarchical ontology 400 includes relationships 406, where the relationships 406 are leaf nodes of the primitives 404 and further define the primitives 404. For example, the relationships associated with the floorplans primitive 408 include at least the "#Bedrooms," "#Bathrooms," and "Price" relationships, each which are an aspect that can further describe a "Floorplan" primitive 408. In particular embodiments, a relationship node, such as the "State" node 410, may simultaneously act as a relationship node and a primitive node. For example, the State node 410 may be a leaf node of the Location node 412, however, the State node 410 may include the leaf nodes "City" 414A and "School District" 414B that branch from the State node 410. In particular embodiments, when a user input is processed via the process 300, the user input may be transformed into a data type similar to the ontology shown in the present embodiment, where meaningful portions of the user input (such as a location) are identified and represented via an ontology node. In various embodiments, transmitting a search query representative of an ontology allows for faster, more efficient, and more accurate search results.

Figure 5:
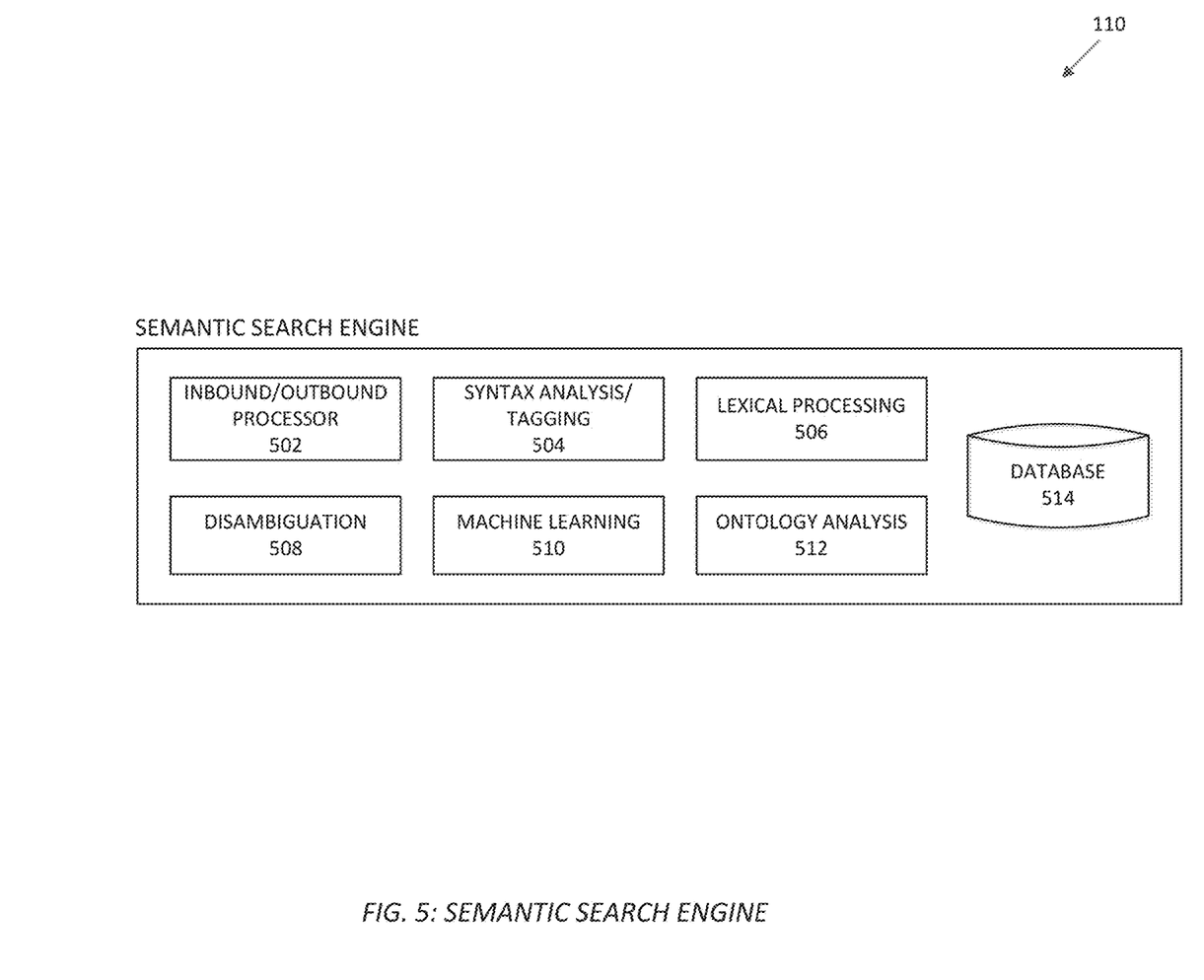
FIG. 5 is a diagram illustrating an exemplary semantic search engine, according to one aspect of the present disclosure.

In one embodiment, FIG. 5 illustrates a diagram of the exemplary semantic search engine 110. As mentioned above in the discussion of FIG. 1, the semantic search engine 110 may include various software modules for processing user speech and/or text input. As shown in the present embodiment, the semantic search engine 110 includes modules and processors such as an inbound/outbound processor 502, a syntax analysis/tagging module 504, a lexical processing module 506, a disambiguation module 508, a machine learning module 510, and an ontology analysis module 512. In certain embodiments, each module included in the semantic search engine 110 may include a particular database for that module, or the modules may access the semantic search engine database 514 for storing and retrieving data such as processed user inputs, $3^{rd}$ party data, other users' search data, machine learning data and historical outcomes, etc. According to various aspects of the present disclosure, the modules and processors included in the semantic search engine 110 may operate independently (e.g., on separate processing resources), or the modules may share processing resources/hardware.

In a particular embodiment, the inbound/outbound processor 502 may receive and transmit data to and from the mobile computing device 102. For example, a user's text input may be received at the inbound/outbound processor 502, and then the processor 502 may furthermore transmit back to the device 102 a generated search query. In some embodiments, the inbound/outbound processor 502 may determine where to transmit received data within the semantic search engine 110, such as determining to transmit received data to the syntax analysis/tagging module 504.

In various embodiments, the syntax analysis/tagging module 504, the lexical processing module 506, and the disambiguation module 508 each may be configured to execute their corresponding steps described in association with the process 300 (e.g., steps 302, 304, 306, and 308). In particular embodiments, the machine learning module 510 and ontology analysis module 512 may also be configured to execute corresponding steps from the process 300, such as the input suggestion step 310 and the generate query step 312. However, the present embodiment illustrates one exemplary configuration of the semantic search engine 110 and is not intended to limit the disclosure from other variations.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed systems and methods will become apparent from the information disclosed in the drawings. Variations and modifications to the disclosed systems and methods may be effected without departing from the spirit and scope of the novel concepts of the disclosure.

It will, nevertheless, be understood that no limitation of the scope of the disclosure is intended by the information disclosed in the drawings; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and methods to the precise forms disclosed. Many modifications and variations are possible in light of the above teaching.

The embodiments were chosen and described in order to explain the principles of the systems and methods and their practical application so as to enable others skilled in the art to utilize the various embodiments and with various modifications as are suited to the particular use contemplated. Alternative embodiments will become apparent to those skilled in the art to which the present systems and methods pertain without departing from their spirit and scope. Accordingly, the scope of the present systems and methods is defined by the appended claims rather than the foregoing description and the exemplary embodiments described therein.

What is claimed is:

1. A system comprising:
   a web-based platform operatively connected to an electronic computing device running an application, wherein the web-based platform is configured to receive real-time user input from the electronic computing device in response to a user providing a plurality of search terms via the application, and wherein the plurality of search terms comprise location, price, and/or size information relating to available dwellings for rent or purchase; and
   a semantic search engine operatively connected to the web-based platform, wherein the semantic search engine is configured to receive the real-time user input from the web-based platform, and wherein in response to receiving the real-time user input, the sematic search engine is operable to:
   perform text processing on the real-time user input for determining a semantic context of the real-time user input via natural language processing algorithms, wherein performing text processing comprises parsing the real-time user input to detect phonemes representative of spoken words in the real-time user input and analyzing the detected phonemes to identify the plurality of search terms, and wherein the text processing generates a search query comprising a plurality of search terms based on the detected phonemes;
   transmit the search query to a search database for matching the plurality of search terms with relevant data, wherein relevant data comprises dwelling listings and corresponding dwelling listing information;
   receive search results from the search database, wherein the search results comprise matched relevant data; and
   transmit the search results to the user for presenting the search results on a display at the electronic computing device, wherein the search results comprise one or more listings for available dwellings for rent or purchase, wherein each dwelling comprises characteristics matching a semantic meaning of the location, price, and/or size information provided in the real-time user input.

2. The system of claim 1, wherein text processing further comprises:
performing lexical processing on the real-time user input, wherein lexical processing comprises parsing the real-time user input to remove typos, and further comprises generating lexically processed text objects from parsed real-time user input;
tagging the lexically processed text objects with metadata to generate tagged text objects;
performing syntax analysis on the tagged text objects, wherein syntax analysis comprises analyzing individual terms in the tagged text objects for identifying a relational text structure based on predetermined grammar rules; and
generating the search query, wherein the search query comprises a plurality of search terms including the lexically processed text objects and/or the tagged text objects, to be transmitted to the semantic search engine.

3. The system of claim 1, wherein the semantic search engine is further operable to, in response to performing syntax analysis on the tagged text objects, perform a disambiguation process on the tagged text objects, wherein the disambiguation process comprises evaluating a tagged text object as multiple tagged text objects for independently processing each of the multiple tagged text objects for generating multiple search queries, wherein each of the multiple search queries comprises a separate search query with a different semantic context, and wherein a particular search query of the multiple search queries is determined to be an optimal search query based on its search results from matching with the relevant data in the search database.

4. The system of claim 1, wherein the semantic search engine is further operable to generate input suggestions based on the tagged text.

5. The system of claim 4, wherein input suggestions are generated based on models trained via machine learning algorithms.

6. The system of claim 1, wherein the real-time user input comprises text and/or voice data.

7. The system of claim 6, wherein prior to performing text processing, the system determines if the real-time user input comprises voice data.

8. The system of claim 7, wherein in response to determining that the real-time user input comprises voice data, converting the voice data to text via speech-to-text algorithms.

9. The system of claim 2, wherein tagging the lexically processed text objects comprises inserting metadata at locations in the lexically processed text objects identified to include a search keyword.

10. The system of claim 9, wherein a search keyword comprises a particular state, city, and/or zip code, and the metadata includes a geographic location tag for classifying the search keyword.

11. A method, wherein a semantic search engine operatively connected to a web-based platform is configured to receive real-time user input from the web-based platform, wherein the web-based platform is operatively connected to an electronic computing device running an application and is configured to receive the real-time user input from the electronic computing device in response to a user providing a plurality of search terms via the application, and wherein the plurality of search terms comprise location, price, and/or size information relating to available dwellings for rent or purchase, and in response to receiving the real-time user input, the sematic search engine is operable to perform the method steps of:
performing text processing on the real-time user input for determining a semantic context of the real-time user input via natural language processing algorithms, wherein performing text processing comprises parsing the real-time user input to detect phonemes representative of spoken words in the real-time user input and analyzing the detected phonemes to identify the plurality of search terms, and wherein the text processing generates a search query comprising a plurality of search terms based on the detected phonemes;
transmitting the search query to a search database for matching the plurality of search terms with relevant data, wherein relevant data comprises dwelling listings and corresponding dwelling listing information;
receiving search results from the search database, wherein the search results comprise matched relevant data; and
transmitting the search results to the user for presenting the search results on a display at the electronic computing device, wherein the search results comprise one or more listings for available dwellings for rent or purchase, wherein each dwelling comprises characteristics matching a semantic meaning of the location, price, and/or size information provided in the real-time user input.

12. The method of claim 11, wherein text processing further comprises:
performing lexical processing on the real-time user input, wherein lexical processing comprises parsing the real-time user input to remove typos, and further comprises generating lexically processed text objects from parsed real-time user input;
tagging the lexically processed text objects with metadata to generate tagged text objects;
performing syntax analysis on the tagged text objects, wherein syntax analysis comprises analyzing individual terms in the tagged text objects for identifying a relational text structure based on predetermined grammar rules; and
generating the search query, wherein the search query comprises a plurality of search terms including the lexically processed text objects and/or the tagged text objects, to be transmitted to the semantic search engine.

13. The method of claim 11, wherein the semantic search engine is further operable to perform the step of, in response to performing syntax analysis on the tagged text objects, performing a disambiguation process on the tagged text objects, wherein the disambiguation process comprises evaluating a tagged text object as multiple tagged text objects for independently processing each of the multiple tagged text objects for generating multiple search queries, wherein each of the multiple search queries comprises a separate search query with a different semantic context, and wherein a particular search query of the multiple search queries is determined to be an optimal search query based on its search results from matching with the relevant data in the search database.

14. The method of claim 11, wherein the semantic search engine is further operable to perform the step of generating input suggestions based on the tagged text.

15. The method of claim 14, wherein input suggestions are generated based on models trained via machine learning algorithms.

16. The method of claim 11, wherein the real-time user input comprises text and/or voice data.

17. The method of claim 16, wherein prior to performing text processing, the method further comprises the step of determining if the real-time user input comprises voice data.

18. The method of claim 17, wherein in response to determining that the real-time user input comprises voice data, converting the voice data to text via speech-to-text algorithms.

19. The method of claim 12, wherein tagging the lexically processed text objects comprises inserting metadata at locations in the lexically processed text objects identified to include a search keyword.

20. The method of claim 19, wherein a search keyword comprises a particular state, city, and/or zip code, and the metadata includes a geographic location tag for classifying the search keyword.

* * * * *